May 3, 1927.  1,626,676
P. HANSMANN ET AL
ANTISIDE DRAFT PLOW HITCH
Filed Feb. 15, 1924
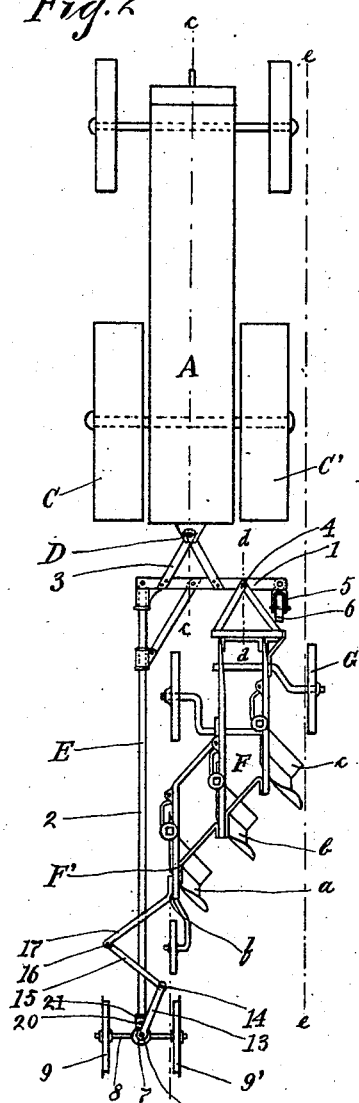
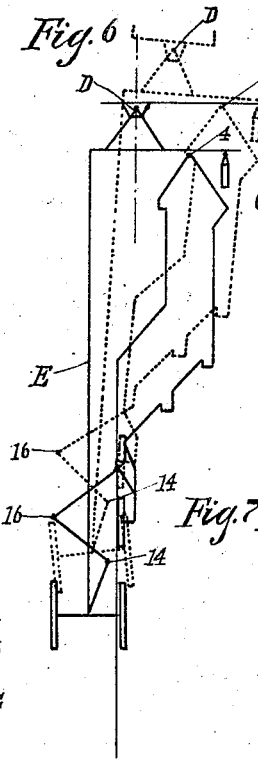
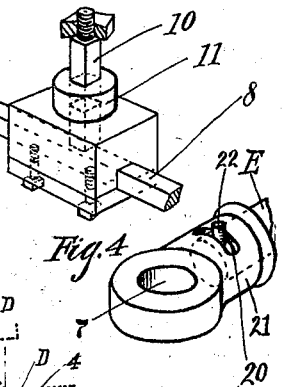
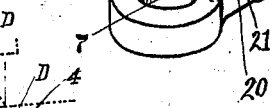
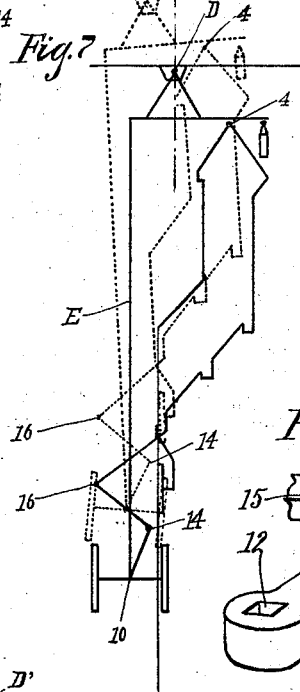
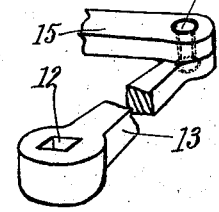
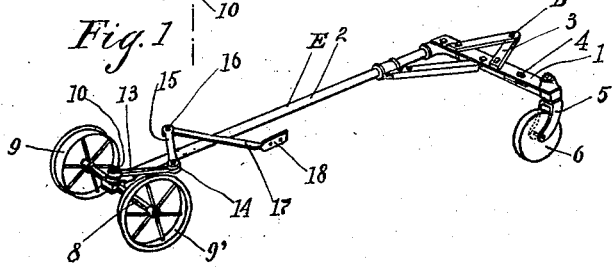
Inventors,
Paul Hansmann
Herman Strack
by H. S. Johnson
their Attorney.

Patented May 3, 1927.

1,626,676

UNITED STATES PATENT OFFICE.

PAUL HANSMANN AND HERMAN STRACK, OF LONG PRAIRIE, MINNESOTA, ASSIGNORS, BY MESNE ASSIGNMENTS, TO THE SAID HANSMANN.

ANTI-SIDE-DRAFT PLOW HITCH.

Application filed February 15, 1924. Serial No. 693,110.

This invention relates generally to the construction of a tractor operated plow.

A general object of the invention is to provide a plow structure in which side draft effects on the plow unit are overcome to a sufficient extent to attach the plow unit in a sufficiently offset relation to the tractor to permit the tractor wheels to travel on unplowed ground.

The object referred to is attained by the use of a tongue member having a wheeled support at its rearward end and provided with a lateral extension at its forward end for attachment, intermediate its ends, with the draw bar head of the tractor. The plow unit is pivotally attached to the transverse arm on the other side of the point of connection of the arm with the draw bar, and in a relatively offset position, to provide a balancing relation to the tongue member. A caster wheel preferably supports the free end of the lateral tongue extension. A connection, including a link member, between the plow unit and the wheeled support of the tongue maintains the plow in its spaced apart relation to the truck. The weight of the tongue and wheeled support acting through the transverse extension is applied to balance the plow unit and assist in maintaining the plow unit in its offset position. The function of the tongue and wheeled or truck support is to maintain the plow in the offset position referred to.

In the drawings:

Figure 1 is a perspective view of the invention.

Figure 2 is a plan view of a tractor and a gang plow showing the invention interposed between them.

Figure 3 is a perspective view of the pivot pin mounting of the truck.

Figure 4 is a perspective view of the pivot end of the tongue of the truck.

Figure 5 is a perspective view of the lever for turning the truck; and

Figures 6 and 7 are diagrammatic views showing the position assumed by the truck and plow when turning curves.

In the drawings, A designates the body of a tractor, B the axle and C and C' the traction wheels thereof. D represents the draw bar pivot pin or main pivot located midway between the traction wheels and coincident with the line $c$—$c$, indicating the center of draft of the tractor. The line $d$—$d$ indicates the center of draft of the gang plow.

To carry out our invention we employ a tongue truck, the tongue E thereof constituting a long lever bent at right angles to form the cross member 1 and the long longitudinal member 2, the lever being fulcrumed on the tractor by means of the pivot pin D projected through an opening D' in the extension 3, secured to the cross member. Spaced toward the furrow line $e$—$e$ and journaled to rotate in a horizontal plane on the cross member 1, is the fork 5, rotatably supporting the wheel 6, the wheel being offset to form a caster wheel. The caster wheel runs on the unplowed ground adjacent the furrow and supports the end of the cross member 1. The pivot 4, as shown, is positioned in the line $d$—$d$ representing the center of draft of the bottoms $a$, $b$, and $c$, the bottom $c$ extending with its point $c'$ to the furrow line. As shown, the wheel G of the plow runs in the furrow. The long member 2 extends to the rear of the plow, and pivotally carries thereat by means of the eye 7, the axle 8 equipped with the truck wheels 9 and 9', the wheel 9' being arranged to run in the furrow cut by the bottom $a$. Secured rigidly on the axle is the vertical squared pivot pin 10 having a circular portion 11, rotatably fitting the bore of the eye 7. Having a squared opening 12 to receive the pin 10, and extending obliquely toward the plow, is the lever arm 13, having pivotal connection 14 with the link 15, said link extending forwardly away from the plow and beyond the tongue E, and having pivotal connection 16 with the arm 17. The arm 17 extends forwardly toward the plow, crossing over the tongue about midway of its length and is formed with a bolting plate 18, whereby the arm is bolted to the frame F' at $f$. The pivots 14 and 16 are of a loose nature (Figure 5) so as to permit the wheels and axle to oscillate slightly. The truck wheels have peripheral outstanding flanges to cut into the soil, thereby affording resistance to a skidding movement. Secured loosely over the lever 17 on the tongue is the guide strap 19, which prevents the lever 13, the link 15, and the arm 17 (which may, as a whole, be termed lever mechanism) from buckling.

In operation, the long lever 2 of the fulcrumed tongue of the truck is weighted down by the wheeled element (constituted by the truck axle and its wheels) together with the lever mechanism mounted thereat, while the short lever on the other side of the fulcrum D, receives the rearward pull of the plow. As the distance between lines c—c and d—d is very short as compared with the length of member 2, the pull on the main pivot D is so balanced as to render the line c—c the center of draft for the truck and plow combined.

Obviously, in a turning movement to the left, the tongue will move away from the plow assuming a position indicated by dotted lines (Figure 7), and toward the plow when turning to the right (Figure 6). To avoid collision or wide separation between the truck and plow, the lever mechanism described is provided, which operates to automatically turn the wheeled element of the truck to steer it away from or toward the plow, as the case may be. As the tongue of the truck approaches the plow sidewise, the arm 17, through the link connection 15, turns the wheeled element as shown in Figure 6 of the drawings, wherein the tongue is moving away from the plow.

The exact opposite movement occurs when the tractor turns to the left, as shown in Figure 7 of the drawings. Thus, the truck is controlled by lever mechanism connected with the plow. To enable the wheeled element to oscillate so as to conform to the ground, a transverse slot 20 in the hub 21 rotatably fitting around the tongue is provided, the pin 22 secured in the tongue working loosely in said slot.

We claim:

1. In a tractor operated plow, a tongue member having a rearward extending longitudinal member and a transverse bar at its forward end, a pair of flanged truck wheels supporting the rearward end of the tongue member, a connection between the draw bar of the tractor and a point intermediate the ends of the transverse bar, a caster wheel supporting the free end of the transverse bar, and a plow unit pivotally connected at its forward end to the transverse bar in an offset position between the points of connection of the transverse bar with the tractor draw bar and with the caster wheel, the weight of the wheel supported tongue member serving to balance the plow in its offset position.

2. In a tractor operated plow, a tongue member having a rearward extending longitudinal member and a transverse bar at its forward end, a pair of flanged truck wheels supporting the rearward end of the tongue member, one of said wheels being arranged to travel in the furrow, a connection between the draw bar of the tractor and a point intermediate the ends of the transverse bar, a caster wheel supporting the free end of the transverse bar, a plow unit consisting of two plows pivotally connected at its forward end to the transverse bar in an offset position between the points of connection of the transverse bar with the tractor draw bar and with the caster wheel, and a link connection between the rear supporting wheels of the tongue and the plow unit to maintain a laterally spaced relation of the plow unit and the tongue member when turning a corner in operation.

3. In a tractor hitch construction for plows, a tongue member having a laterally extending arm at its forward extremity and a guide wheel supporting its rearward extremity, a connection between the draw-bar head of a tractor and a point intermediate the ends of said laterally extending arm, a plow pivotally connected at its forward end to said arm, and a connection including a link member between the rearward portion of the plow and said guide wheel for maintaining the plow in a laterally spaced relation with the tongue member.

4. In a tractor hitch construction for gang plows, a tongue member having a laterally extending arm at its forward end, a connection between the tractor draw-bar head and a point intermediate the ends of said laterally extending arm, a gang plow unit pivotally connected to said arm, a wheeled ground element attached to the rearward extremity of said tongue member, and controlling means including a link member operatively connecting said plow unit and said ground element to maintain the plow unit in a laterally spaced relation to the ground element.

In testimony whereof we affix our signatures.

PAUL HANSMANN.
HERMAN STRACK.